United States Patent

[11] 3,633,943

[72] Inventors: Joseph Louis Ramm, Metairie, La.;
Joseph Peter Ferraro, Scotch Plains, N.J.;
Joseph Anthony Munder, Westchester, Ohio
[21] Appl. No. 11,043
[22] Filed Feb. 13, 1970
[45] Patented Jan. 11, 1972
[73] Assignee Johns-Manville Corporation
New York, N.Y.

[54] FITTING AND METHOD OF MAKING THE SAME
13 Claims, 5 Drawing Figs.
[52] U.S. Cl. .................................................. 285/22,
285/156, 285/373, 285/DIG. 16, 285/DIG. 423
[51] Int. Cl. ..................................................... F16l 13/02
[50] Field of Search ........................................... 138/128,
156, 158, 159, 160, 161, 162, 166, 170, 171, 157;
285/21, 22, 423, 373, 419, 156, DIG. 16; 156/203,
218, 290, 295, 304, 466; 29/157 A, 157 T, 482,
489

[56] References Cited
UNITED STATES PATENTS
3,264,013   8/1966   Richardson et al. ..........   285/423 X
3,264,012   8/1966   Giovanazzi et al. ............   285/22
3,224,795  12/1965   Conley .........................   285/423 X
FOREIGN PATENTS
877,254    9/1961   Great Britain ................   138/151

Primary Examiner—Dave W. Arola
Attorneys—John A. McKinney and Robert M. Krone

ABSTRACT: A fitting for nonpressure pipe is formed by using a pair of identical half sections wherein each half section is formed by molding a filled thermosetting resin reinforced with glass fibers and the pair of half sections are joined in mating relationship by a layer of adhesive.

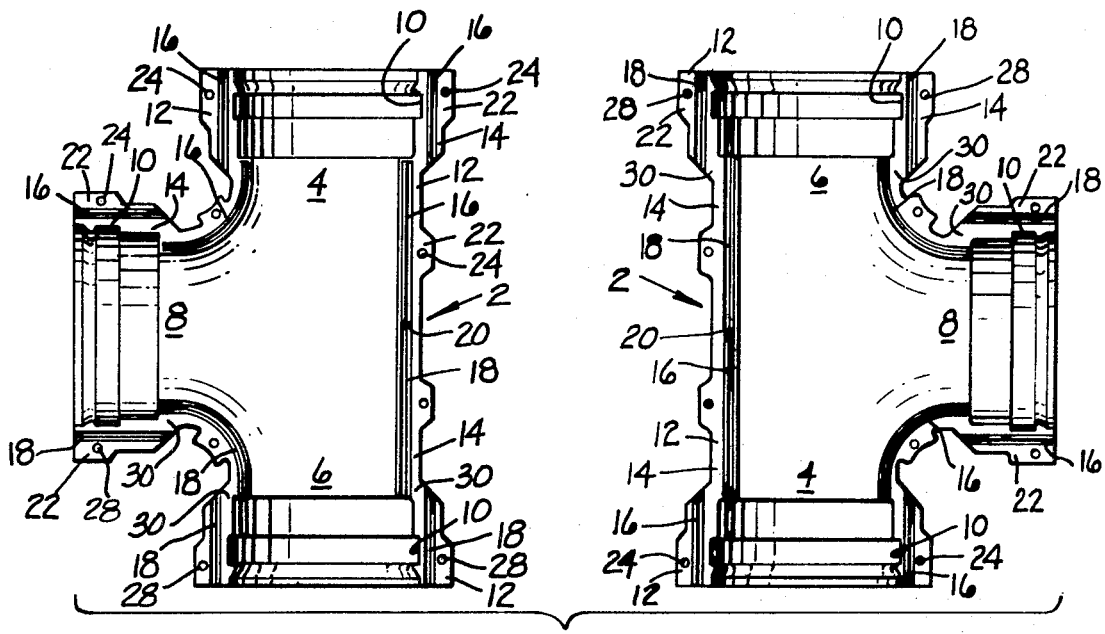
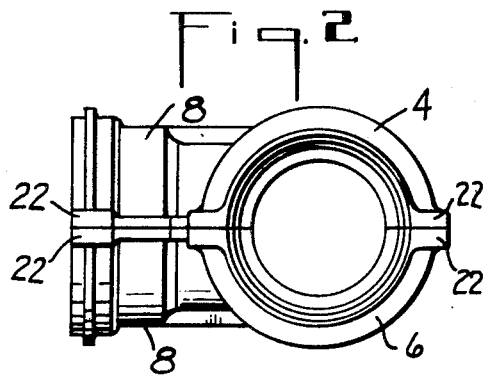
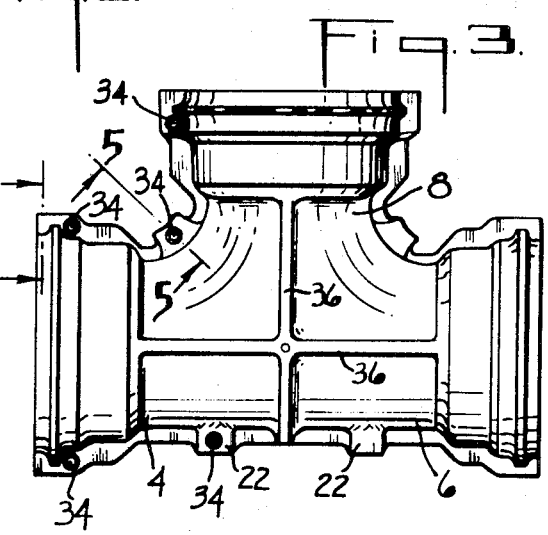
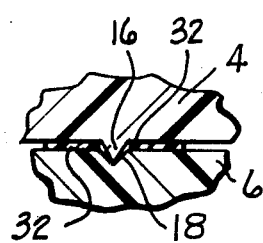
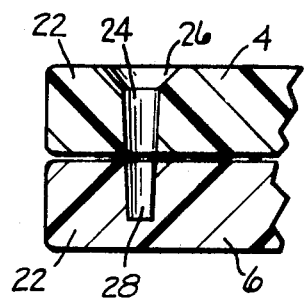
INVENTORS,
JOSEPH LOUIS RAMM
JOSEPH PETER FERRARO
JOSEPH ANTHONY MUNDER
BY
ATTORNEY

FITTING AND METHOD OF MAKING THE SAME

BACKGROUND OF THE INVENTION

1. Field of the Invention

This invention relates to a nonpressure pipe fitting and a method for forming such fitting and in particular to a molded pipe fitting formed from a filled thermosetting resin reinforced with glass fiber and wherein such fitting is particularly useful with a rubber ring joint. Furthermore, the fitting is particularly suited for use with nonpressure asbestos-cement sewer pipe.

2. Description of the Prior Art

For many years, the asbestos-cement pipe industry has used fittings of various natures such as cast iron, blow-molded thermoplastic, and glued together sections of asbestos-cement pipe. All of these fittings present problems in their use with asbestos-cement pipe. The cast iron fitting does not possess the resistance to corrosion of the asbestos-cement pipe. The thermoplastic fitting deforms easily under even modest loads and deforms sharply when the effluent carried by it is at or near 150° F. The glued-together sections of asbestos-cement pipe form a fitting that is not attractive in appearance and is costly to fabricate.

BRIEF SUMMARY OF THE INVENTION

It is an object of this invention to provide a noncorrosive, temperature-resistant, economical and attractive fitting for nonpressure pipe.

It is a further object of this invention to provide a noncorrosive, temperature-resistant, economical and attractive fitting for nonpressure asbestos-cement sewer pipe having a rubber ring joint.

The foregoing objects are accomplished in accordance with the instant invention by molding half sections of a fitting from a filled thermosetting resin reinforced with glass fiber. These half sections are then assembled with suitable adhesive and fasteners to form a fitting. The half sections are designed to provide a continuous and uniformly thick layer of adhesive joining the two half sections together and cooperating therewith to form a rigid and attractive fitting.

BRIEF DESCRIPTION OF THE DRAWINGS

The invention will be more fully understood and further objects and advantages thereof will become apparent when reference is made to the following detailed description of a preferred embodiment of the invention and the accompanying drawings in which:

FIG. 1 is a top plan view of two half sections of a fitting;

FIG. 2 is an end view of a fitting assembled from the half sections of FIG. 1;

FIG. 3 is a side elevation of a fitting assembled from the half sections of FIG. 1;

FIG. 4 is a partial view in cross section taken on a plane passing through the line 4—4 of FIG. 3; and FIG. 5 is a partial view in cross section taken on a plane passing through the line 5—5 of FIG. 3.

DESCRIPTION OF THE PREFERRED EMBODIMENT

Referring to the drawings and in particular to FIG. 1, there are disclosed two half sections 2 having a shape such that when the half sections are joined, there will be formed a T-fitting for use in pipelines. The half sections are formed by molding preferably using a filled thermosetting resin reinforced with glass fiber. Although the half sections illustrated in FIG. 1 are shaped to form a T-fitting when assembled, it is recognized that the half sections can be shaped to form other fittings when assembled such as L's, Y's, angles, and bends.

Each half section 2 comprises body portions 4, 6, and 8 comprising respectively the half sections of the arms and stem of the T. The end portions of the arms 4 and 6 and the stem 8 are formed in the mold as a bell end having grooves 10 to accommodate rubber ring gaskets which are adapted to cooperate in the assembled fitting with pipe ends inserted therein to form a fluidtight seal.

Each half section 2 terminates in a base 12 having a surface 14 which is designed to mate with another half section. The surface 14 is provided with a plurality of tongues 16 and grooves 18. As illustrated in FIG. 1, the tongues 16 are located on one half side of each half section and the grooves are located on the other half side of the half section. This arrangement is made so that only one mold is required to form the half sections. As illustrated in FIG. 1, the half sections 2 are centered relative to each other by the tongues 16 mating with the grooves 10. Line 20 on FIG. 1 shows the junction of a tongue 16 with a groove 18 at approximately the midpoint of the half section 2. As illustrated in FIG. 4, the height of the tongues 16 is greater than the depth of the grooves 18 so as to space the surfaces 14 of mating half sections from each other a small distance. The base 12 is also provided at spaced intervals with flanges 22. As illustrated in FIG. 5, half of the flanges are molded with an opening 24 having a tapered entrance 26 while the other half of the flanges are provided with holes 28 extending partially therethrough. If desired, the half sections may be centered and spaced by bosses around holes 28 and recesses around opening 24 and the holes 28 may extend completely through the flanges 22. The opening 24 and the hole 28 are preferably tapered so as to minimize the danger of stripping threads.

A fitting illustrated in FIGS. 2 and 3 is made from the half section 2 of FIG. 1 in the following manner. The grooves 14 in each half section 2 are filled with a suitable adhesive such as an epoxy, polyester, or acrylic adhesive. One half section is superposed over the other half section and the two half sections are brought together with the tongues 16 in each half section mating with and entering into the grooves 18 of the other half section. The entry of the tongues 16 into the grooves 18 forces the adhesive out of the grooves 18 and into contact with the adjacent surfaces 14 of both mating half sections 2. The tongues 16 and the grooves 18 are designed so that sufficient adhesive will be present in the grooves 18 so that when the adhesive is forced out of the grooves 18 by the tongues 16, a continuous layer 32 of adhesive will be present between each of the mating surfaces 14 of the half section 2 from one axial end opening to any other axial end opening along one continuous mating line. The thickness of this layer of adhesive, as determined by the difference between the height of the tongues 16 and the depth of the grooves 18, is preferably between 1 and 60 mils thick. In some instances, to insure continuity of the adhesive layer and a proper seal, a continuous line of adhesive will be laid on the surface 14 between the terminal portions of adjacent grooves 18 as indicated at 30.

After the half sections 2 have been mated, steel fasteners 34, such as self-tapping screws, are threaded through the openings 24 into the holes 28 and function to hold the half sections in mating relationship until the adhesive has cured. In FIG. 4 the adhesive as illustrated terminates a short distance on each side of the tongue and groove relationship. However, where additional strength is required in the fittings, sufficient adhesive may be deposited in the grooves 18 so that a layer of adhesive will coincide with the outside and inside edges of surface 14. As illustrated in FIG. 3, each half section is molded with reinforced ribs 36.

Fittings in accordance with the foregoing specification have been formed from a filled thermosetting resin reinforced with glass fibers such as a glass fiber sheet embedded in a matrix of vinyl ester resin. Material of this nature is sold commercially as sheet molding compounds such as that marketed by the Dow Chemical Company under the trade designation DOW SMC–Derakane CX 7000—50. Other fittings were manufactured using bulk molding compounds comprising chopped glass fiber strands imbedded in a matrix of isophthalic polyester resin such as the bulk molding compound marketed by the American Cyanamid Company under the trade designation BMC–L Laminac PDL–7–989. However, it is understood that other thermosetting resins reinforced with glass or other fibers or other fibrous materials may be used in molding the half sections of this invention.

The half sections formed from the above sheet molding compound were joined together with an epoxy-type adhesive such as that marketed by the Smooth-On Company under the trade designation Smooth-On 2-107. Other adhesives such as polyester and acrylic adhesives may also be used within the scope of this invention. The surfaces 14 are preferably sandblasted so as to insure a good bond with the adhesive. In some instances, it may be desirable to prepare the surface using a solvent prior to applying the adhesive. It should be noted that the adhesive used must be selected to insure a good and permanent bond since the half sections throughout their life of operation are held together chiefly by the adhesive. The steel fasteners are used primarily only to hold the half sections in assembled relationship while the adhesive is being cured.

Fittings made as described above were subjected to the usual standard flexural and impact tests for fittings for use with asbestos-cement sewer pipe. These fittings were found to have physical characteristics similar to the fittings presently used for such service and are acceptable for such commercial use.

What we claim is:

1. A fitting comprising:
  a. first and second half lateral sections adapted to be mated together to form said fitting for connecting pipe ends and defining a fluid-carrying connection therebetween,
  b. a layer of adhesive joining said first and said second half sections in mating relationship, and
  c. means integral with each of said first and second half sections and arranged in cooperating relationship to space said first half section from said second half section and to control the thickness of said layer of adhesive.

2. A fitting as defined in claim 1 wherein said means comprises:
  a. cooperating tongues and grooves in said first and second half sections, and
  b. said tongues having a height greater than the depth of said grooves.

3. A fitting as defined in claim 2 wherein:
  a. each of said first and second half sections is provided with a plurality of tongues and grooves.

4. A fitting as defined in claim 2 wherein:
  a. said first and second half sections are molded from a filled thermosetting resin reinforced with fiber.

5. A fitting as defined in claim 2 wherein:
  a. said first and second half sections are molded from a filled thermosetting resin reinforced with glass fiber.

6. A fitting as defined in claim 2 and further comprising:
  a. means for initially holding said first and second half sections in mating relationship until they are joined by said layer of adhesive.

7. A fitting as defined in claim 2 wherein:
  a. said first and said second half sections in mating relationship are spaced from each other a distance of between about 1 and 60 mils.

8. A fitting as defined in claim 2 wherein:
  a. said layer of adhesive is continuous throughout the extent of the mated portions of said first and second half sections from one end opening to another end opening of said fitting.

9. A fitting as defined in claim 8 wherein:
  a. said first and said second half sections are identical to each other.

10. A method for forming a fitting comprising:
  a. molding a plurality of identical half sections from a filled thermosetting resin reinforced with fibers, each half section having mating surfaces with a plurality of tongues and grooves therein with the tongues having a greater height than the depth of the grooves,
  b. filling all of said grooves in said two half sections with an adhesive,
  c. mating said two half sections with the tongues in one half section nestled in the grooves of the other half section and the tongues in said other half section nestled in the grooves of said one half section but with said mating surfaces of said half sections spaced from each other a short distance by the tongues and grooves, and
  d. applying sufficient force to said mated half sections to squeeze a uniform layer of said adhesive out of said groove to form a continuous layer of adhesive in contact with said surfaces of each half section and extending throughout the axial extent of the mated portions of said half sections.

11. A fitting as defined in claim 1 wherein said means comprises:
  a. bosses on a portion of the first half section for cooperating with recesses in a portion of the second half section, and
  b. said bosses having a height greater than the depth of the recesses.

12. A fitting as defined in claim 11 including means adjacent the bosses and recesses for holding said first and second half sections in mating relationship until supplemented by the holding action of said adhesive therebetween.

13. A fitting comprising:
  a. first and second lateral half sections of molded thermosetting resin reinforced with glass fibers and are adapted to be mated together to form said fitting for connecting pipe ends and defining a fluid-carrying connection therebetween,
  b. boss means on portions of the first half section for cooperating with recess means in portions of the second half section,
  c. generally planar surfaces on either side of respective boss means and recess means adapted to face each other when said halves are mated,
  d. said boss means having a greater height than the depth of the recess means thereby establishing spacing between the facing surfaces,
  e. a layer of adhesive between said surfaces joining said first and second half sections in mating relationship, and
  f. means adjacent cooperating boss means and recess means for fixedly holding the first and second half sections in mating relationship until supplemented by the holding action of said adhesive between and joining the surfaces.

* * * * *